United States Patent
Ballard

(10) Patent No.: US 11,590,426 B2
(45) Date of Patent: Feb. 28, 2023

(54) UPDATED DRIVER PARAMETERS DETERMINED BY TELEMETRY DATA

(71) Applicant: Microsoft Technology Licensing, LLC, Redmond, WA (US)

(72) Inventor: Jeffrey Ryan Ballard, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/347,354

(22) Filed: Jun. 14, 2021

(65) Prior Publication Data
US 2022/0395754 A1 Dec. 15, 2022

(51) Int. Cl.
*A63F 13/77* (2014.01)
*A63F 13/358* (2014.01)
*A63F 13/44* (2014.01)
*A63F 13/23* (2014.01)

(52) U.S. Cl.
CPC ............. *A63F 13/77* (2014.09); *A63F 13/23* (2014.09); *A63F 13/358* (2014.09); *A63F 13/44* (2014.09); *A63F 2300/552* (2013.01)

(58) Field of Classification Search
CPC ........ A63F 13/358; A63F 13/20; A63F 13/30; A63F 13/32; A63F 13/327; A63F 13/40; A63F 2300/534; H04L 1/0018; G06F 13/161; G06F 2213/0064
See application file for complete search history.

(56) References Cited

U.S. PATENT DOCUMENTS

| 10,942,588 | B2 | 3/2021 | Mcallen et al. | |
| 2016/0180811 | A1* | 6/2016 | Colenbrander | G06K 9/6201 356/402 |
| 2019/0321725 | A1* | 10/2019 | Zimring | A63F 13/40 |
| 2020/0278758 | A1 | 9/2020 | Mcallen et al. | |
| 2020/0301814 | A1* | 9/2020 | Phaneuf | G06F 11/3612 |
| 2022/0184492 | A1* | 6/2022 | Harrison | G06F 3/147 |

OTHER PUBLICATIONS

"International Search Report and Written Opinion Issued in PCT Application No. PCT/US22/028978", dated Aug. 31, 2022, 13 Pages.

* cited by examiner

*Primary Examiner* — Omkar A Deodhar
(74) *Attorney, Agent, or Firm* — Alleman Hall Creasman & Tuttle LLP

(57) ABSTRACT

A computing system is provided. The computing system includes a server having one or more processors configured to receive from a user computing device run-time telemetry data, the run-time telemetry data being recorded during execution of a target program of a plurality of programs by the user computing device and being indicative of communication between the user computing device and a user input device. The one or more processors are further configured to determine a performance metric based on the run-time telemetry data, determine an updated driver parameter for the target program based on the determined performance metric, send the updated driver parameter to the user computing device, and apply the updated driver parameter for use during a subsequent execution of the target program.

20 Claims, 5 Drawing Sheets

UPDATED DRIVER PARAMETERS DETERMINED BY TELEMETRY DATA

BACKGROUND

User input devices are often used with interactive systems such as computers, virtual/augmented reality systems, and gaming systems. Interactive programs that are executed by the interactive system are configured manipulate elements of the interactive programs based in part upon input received from the user input devices. One problem with these interactive systems is that there may be a delay between a manipulation of the user input devices and a corresponding change in elements of the interactive programs. Furthermore, there may be multiple causes of the delay, and the causes may differ between different interactive programs.

SUMMARY

A computing system is provided. The computing system comprises a server including one or more processors configured to receive from a user computing device run-time telemetry data, the run-time telemetry data being recorded during execution of a target program of a plurality of programs by the user computing device and being indicative of communication between the user computing device and a user input device. The one or more processors are further configured to determine a performance metric based on the run-time telemetry data, determine an updated driver parameter for the target program based on the determined performance metric, send the updated driver parameter to the user computing device, and apply the updated driver parameter for use during a subsequent execution of the target program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed above, there may be multiple causes of delay between a user input device and a user computing device, and the causes may differ between different programs executed on the user computing device. For this reason, it can be difficult to adopt a single optimization technique that produces preferable results for all programs. As a result, when a latency reduction technology is implemented across a family of programs, the actual latency reduction experienced by users may vary significantly based on the executed program. Some users, expecting improvements from the optimization technique, may be frustrated with sub-optimal improvements to input device latency experienced when using certain programs for which the techniques are less effective.

Figure 1:
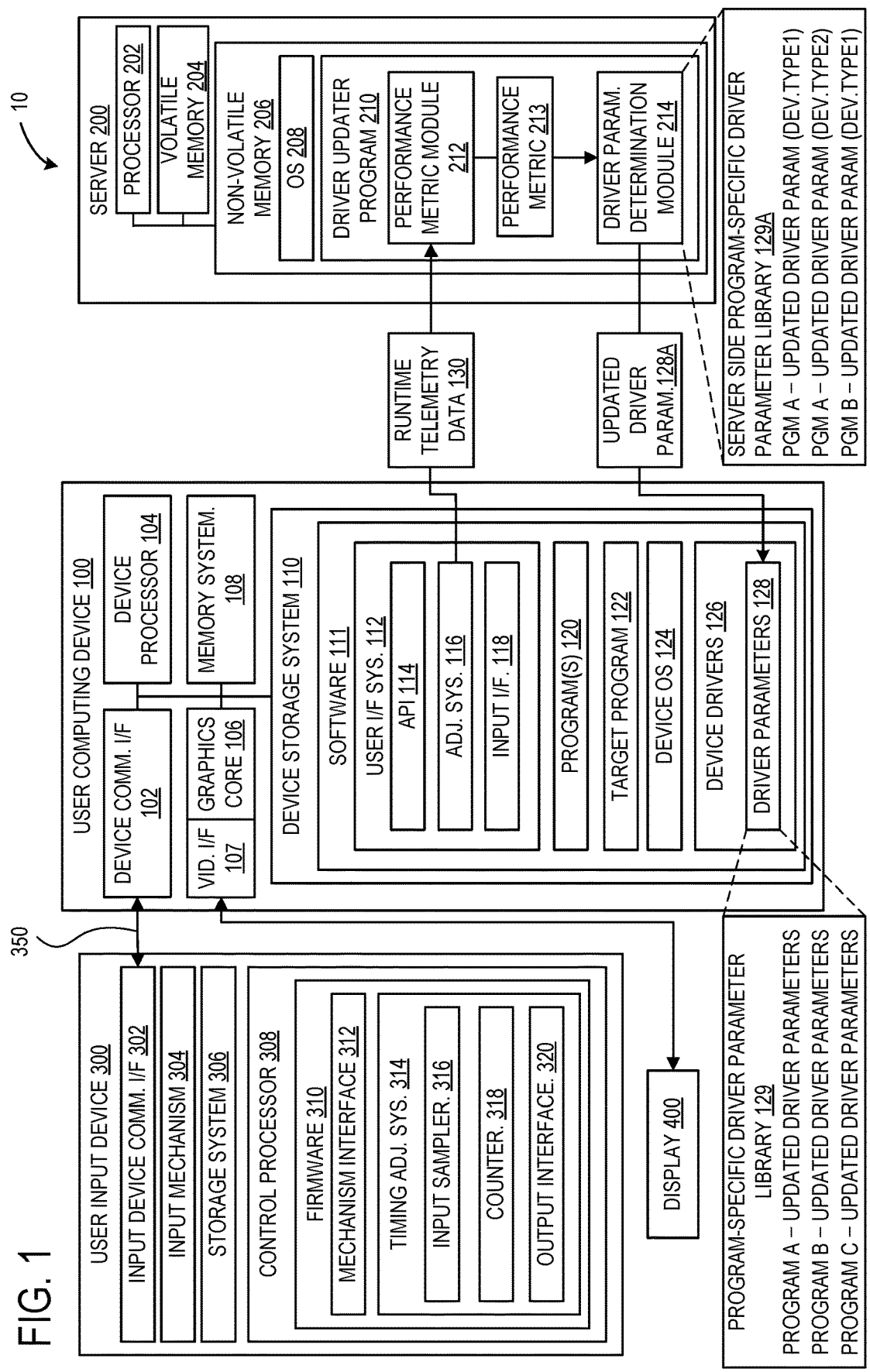
FIG. 1 shows a schematic view of a computing system according to one embodiment of the present disclosure.

To address the above issues, as shown in FIG. 1, a computing system 10 in accordance with one example embodiment of the present invention is disclosed. The computing system 10 comprises a user computing device 100 such as a laptop or desktop computer, gaming console, head mounted virtual or augmented reality device, smartphone, tablet, or kiosk style arcade game. However, any suitable computing device 100 capable of receiving user input from a user input device 300 may be used. The computing device 100 receives input from the user input device 300, examples of which will be described below with reference to FIG. 2. The input is used to, for example, manipulate elements of a plurality of programs 120 executed by the user computing device 100. The user input device 300 communicates with the user computing device 100 using a device driver 126. The device driver 126 provides a software interface for the operating system of the user computing device 100 to interact with the hardware on the user input device 300. As will be discussed in detail below, the device driver 126 includes adjustable driver parameters 128, which are values stored in software, according to which the device driver operates.

The user computing device 100 is configured to, for each of a plurality of programs 120 executable by the user computing device 100, collect run-time telemetry data 130, store the run-time telemetry data at least temporarily in memory, and send the run-time telemetry 130 data to a server 200, via a computer network. The collection may occur on a schedule that is predetermined and periodic, or opportunistic and ad-hoc, for example. The run-time telemetry data 130 is indicative of communication between the user computing device 100 and a user input device 300, and thus may be processed by the server 200 to determine the timing of communications between the user input device and user computing device 100. Specific examples of the run-time telemetry data 130 and details of its processing by server 200 are described below.

The run-time telemetry data 130 is recorded during execution of a target program 122 of a plurality of programs 120 by the user computing device 100. The plurality of programs 120 may be stored in mass storage at the user computing device and are typically executed at separate times by a user, and run-time telemetry data 130 is collected during the execution of each. The run-time telemetry data 130 may be collected for several sessions of execution of the same target program 122 and sent to the server 200 in a batch process, may be sent following the conclusion of a session of the target program 122, or may be sent one or more times in the middle of (i.e., during) a session of the target program 122, for example.

The server 200 is configured to determine a performance metric 213 based on the run-time telemetry data 130, determine, e.g., by computation or selection from stored data, an updated driver parameter 128A based on the determined performance metric 213, and send the updated driver parameter 128A to the user computing device 100. The user computing device 100 is further configured to receive from the server 200 an updated driver parameter 128A for the target program 122 based upon a performance metric 213, install the updated driver parameter 128A, and perform a subsequent execution of the target program 122 using the updated driver parameter 128A.

The server 200 is in communication with the computing device 100 via a computer network such as the Internet. While FIG. 1 depicts only one user computing device 100 linked with the server 200, it will be appreciated that the server 200 may be linked with multiple (e.g. thousands or millions) of user computer devices 100, and receive program-specific runtime telemetry data 130 from each user computer device 100. It will be appreciated that when a large number of user computing devices are involved, the server may track the device type of the user computing devices and may organize run-time telemetry data on a program by program and device type by device type basis, such that updated driver parameters are produced not only for a particular program but also for a particular device type. The device type may include the hardware configuration of the user computing device 100 and the user input device 300 for example.

Continuing with FIG. 1, the server 200 includes one or more processors 202 configured to, for each of the plurality of programs 120 executable by the user computing device 100, receive from the user computing device 100 run-time telemetry data 130 that was recorded during execution of a target program 122 of the plurality of programs 120 by the user computing device 100 and that is indicative of communication between the user computing device and a user input device. The one or more processors 202 are further configured to, via a performance metric module 212, determine a performance metric based on the run-time telemetry data 130. The one or more processors 202 are further configured to, via a driver parameter determination module 214, determine an updated driver parameter 128A for the target program 122 based on the determined performance metric, send the updated driver parameter 128A to the user computing device 100, and apply the updated driver parameter 128A for use during a subsequent execution of the target program 122. In this way, the computing system 10 may detect undesirable performance, due for example to an input latency or lag, during execution of the target program 122 and improve performance via the updated driver parameter 128A.

The interaction of the user computing device 100 and server 200 of computing system 10 will now be described in more detail. It will be appreciated that where an exemplary description of the functions and operations performed in relation to target program 122 are described, similar functions and operations may be performed for other programs 120. As briefly described above, device processor 104 is further configured to, for each of the plurality of programs 120 executable by the user computing device 100 collect run-time telemetry data 130. The run-time telemetry 130 data is typically recorded during execution each of the plurality of programs 120 by the user computing device 100 in a program-specific manner. Run-time telemetry 130 collected for the target program 122, and if desired for each program 120 on a program-by-program basis, is stored in memory, at least temporarily. The device processor 104 is further configured to send the run-time telemetry 130 data for the target program 120 to the server 200. Following processing by the server 200, the device processor of the user computing device 100 is configured to receive from the server 200 an updated driver parameter 128A for each of the plurality of programs 120 that has been computed at the server based upon the performance metric described above. Following receipt, the device processor 104 is configured to install the updated driver parameter 128A on the user computing device 100. Following installation, the device process 104 is configured to perform a subsequent execution of each of the plurality of programs 120 using the updated driver parameter 128A.

It will be appreciated that the user computing device 100 may receive updated driver parameters 128A for each or multiple of the plurality of programs 120 that are executable on the user computing device 100. Accordingly, a program-specific driver parameter library 129 may be stored on the user computing device 100 that includes a plurality of sets of updated driver parameters, each set having a different associated target program 122 with which it is associated. Further, when each program 120 is executed by the user computing device 100, the appropriate updated driver parameters 128A received from the server 200 can be selected for use with the executed target program 122. In this manner, the user computing device 100 can optimize latency for multiple different target programs 122 of the plurality of programs 120, using different optimization techniques for each as implemented through the adoption of the program-specific driver parameters. Likewise, on the server 200, a server-side program specific driver parameter library 129A may be stored, with updated driver parameters 128A for each device type of each user computing device 100, as shown. In this manner, server 200 can send a requesting user computing devices 100 an updated driver parameter that is matched to a device type of the requesting user computing device 100. The device type may include, for example a hardware configuration of the user computing device 100 and of the user input device 300. This may be helpful in providing latency optimization that is tailored not only to the target program but also the requesting device type, to further improve performance of the latency optimization.

Continuing with FIG. 1, server 200 further comprises, volatile memory 204, and non-volatile memory 206 which stores operating system 208 and driver updater program 210. The driver updater program 210 is configured to use as input the run-time telemetry data 130 and to output updated driver parameters 128A. As described above, the updated driver parameters 128A are used by the user computing device 100 in order to reduce input latency or lag.

During execution of the target program 122, when collection of the run-time telemetry data 130 occurs, the user computing device 100 is configured to receive input from the user input device 300 affecting operations of the target program 122. The user input device 300 is in communication with the user computing device 100 via an input device communication interface 302. Input device 300 further includes input mechanism 304, control processor 308, firmware 310, and storage system 306.

Figure 2:
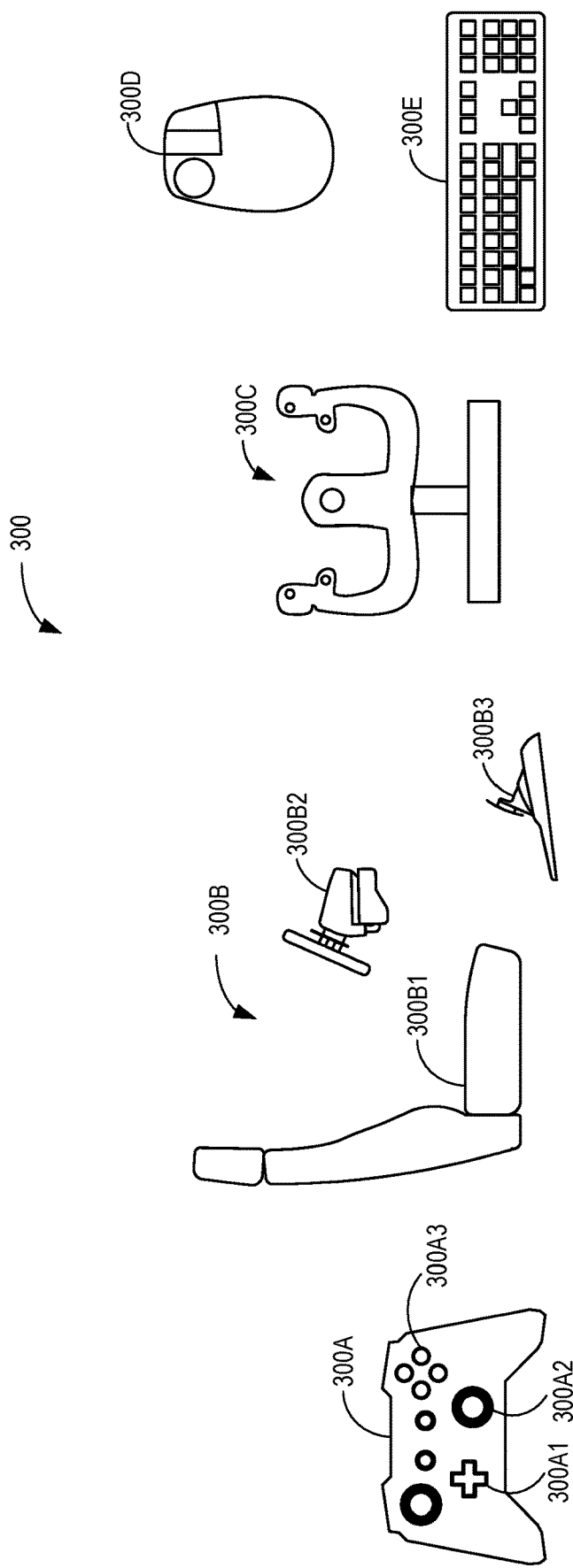
FIG. 2 shows example configurations of a user input device of FIG. 1.

As shown in FIG. 2, the user input device 300 can be a wired or wireless handheld game controller 300A, a racing controller 300B, a flight controller 300C, a mouse 300D, or a keyboard 300E, as some examples. The game controller may include a directional pad 300A1, joystick 300A2, and/or buttons 300A3, as in the case of handheld game controller 300A. Alternatively, game controller can include a steering wheel 300B1, seat 300B2, and/or pedals 300B3 as in the case of racing controller 300B, for use in racing games. Further, the game controller can include a yoke, for example, for commanding aircraft in flight simulator and other games, as found in flight controller 300C. Further still, it will be appreciated that other configurations of user input devices 300 can be used in computing system 10.

Returning to FIG. 1, input device 300 is configured to be manipulatable by a user via one or more input mechanisms 304 to control user interface elements presented by the user computing device 100. These user interface elements can include graphical and textual elements presented on a display 400. Control processor 308 monitors signals associated with user manipulation of the one or more input mechanisms 304 (such as 300A1-300A3, 300B1-300B3, etc.) to produce a user input state based on the user manipulation. Input device 300 includes components such as firmware to reduce lag or input latency for programs 120 executed by the user computing device 100 to which the user input device 300 is communicatively coupled.

Input mechanism 304 comprises various user-facing controls with corresponding electromechanical elements to receive user manipulation and user input. Input mechanism 304 can include actuators, keys, buttons, directional pads (d-pads), triggers, stick controls, pedal controls, wheel controls, pad controls, or other types of controls discussed herein, such as 300A1-300A3 and 300B1-300B3 discussed above. Input mechanism 304 has corresponding measurement elements to interpret the user manipulation into electrical signaling. Measurement elements, such as position sensing elements and transducer elements, can be included in input mechanism 304, and can comprise potentiometers, position determination circuitry, angular resolvers, optoelectronic position sensors, magnetic sensors such as Hall effect sensors or magnetoresistive sensors, encoders, capacitive sensors, inductive sensors, or other position measurement elements and position sensing elements. A/D conversion circuitry can also be included to translate electrical signaling from analog measurement or positioning signals into digital representations of input data for input to control processor 308. In some examples, control processor 308 includes A/D conversion circuitry and receives analog signals from input mechanism 304. Sampling of the analog signals from input mechanism 304 can occur according to predetermined sample rates, or according to a dynamic or adjustable sample rates based on timing adjustments made by control processor 308.

Control processor 308 can comprise one or more microcontrollers, microprocessors, application-specific integrated circuits (ASICs), field-programmable gate arrays (FPGA), or discrete logic and associated circuitry, including combinations thereof. Control processor 308 can include, or be paired with, one or more analog-to-digital conversion elements to receive user input associated with input mechanism 304. Control processor 308 executes firmware 310, which can be stored in storage system 306 until transferred to memory elements of control processor 308 for execution.

Firmware 310 comprises mechanism interface 312 and timing adjustment system 314. Mechanism interface 312 comprises one or more digital interfaces configured to receive digital representations of movement data encoded by elements of input mechanism 304. Mechanism interface 312 can be coupled to a logical or physical interface to input mechanism 304.

Timing adjustment system 314 comprises software or firmware executed by control processor 308 and is configured to adjust delivery timing for the user input state to the user computing device 100. Timing adjustment system 314 comprises one or more computer-executable instructions in storage system 306 or execution memory of control processor 308. Timing adjustment system 314 includes input sampler 316, counter 318, and output interface 320.

Input sampler 316 comprises an interface to receive digital representations of user manipulation of input mechanism 304. These digital representations can be sampled at a particular sample rate, such as by A/D circuitry or other similar circuitry, and can be provided to control processor 308 for delivery to input sampler 316. In some examples, input sampler 316 can adjust or control the sample rate using one or more signals provided to sampling circuitry, such as enable signals or trigger signals provided to A/D circuitry. When input sampler 316 adjusts a sample rate or sample period, input sampler 316 can base this sample rate upon a transfer interval received over input device link 350, with timing offsets based on a transfer offset received over input device link 350.

Counter 318 includes one or more processes to count cycles of time with regard to a count granularity. Counter 318 can maintain counts in one or more registers, memory locations, or other storage elements. These counts can comprise timestamps indicating a current system time, or may instead comprise monotonically increasing or decreasing counts having a count granularity. Counter 318 can provide indications of the present count for inclusion with communications transferred over input device link 350. Counter 318 can also track or generate a periodic timing signal which is used to trigger delivery of user input state by output interface 320. This periodic timing signal can be based on a transfer interval received over input device link 350.

Output interface 320 comprises adjustable interfacing processes to provide the user input state over input device link 350 using input device communication interface 302. Output interface 320 can also adjust a delivery time of the user input state according to one or more timing parameters received over input device link 350.

Input device communication interface 302 comprises transceivers, interfacing circuitry, control logic, and other elements for communicating digital representations of user input state and other information over input device link 350. Communication interface 302 can comprise circuitry, processing elements, and software that communicates over various protocols and formats, such as USB, Bluetooth, IP, Ethernet, TCP, WiFi, NFC, infrared communications, other wired or wireless data interfaces, or some other communication format.

Continuing with FIG. 1, user computing device 100 includes device processor 104, graphics core 106, video interface 107, memory system 108, device communication interface 102, and storage system 416. User computing device 100 includes software 111 which directs operation of processing elements of user computing device 100 to operate as discussed herein. In one implementation, software 410 is stored on a non-transitory computer-readable medium, such as device storage system 416. Device processor 104 loads and executes software 111 from device storage system 110. Software 111 includes device operating system 124, device drivers 126 having driver parameters 128, programs 120, and target program 122. Software 111 further includes user interface system 112 which comprises application programming interface (API) 114, adjustment system 116, and input interface 118.

Graphics cores 106 include various hardware components, such as processing stages, memory elements, and other pipelined processing elements for processing graphics data into rendered graphics that is presented on the display 400. Graphics cores 106 may be provided in a graphics processing unit (GPU) with one or more graphics cores and associated memory elements.

Figure 3:
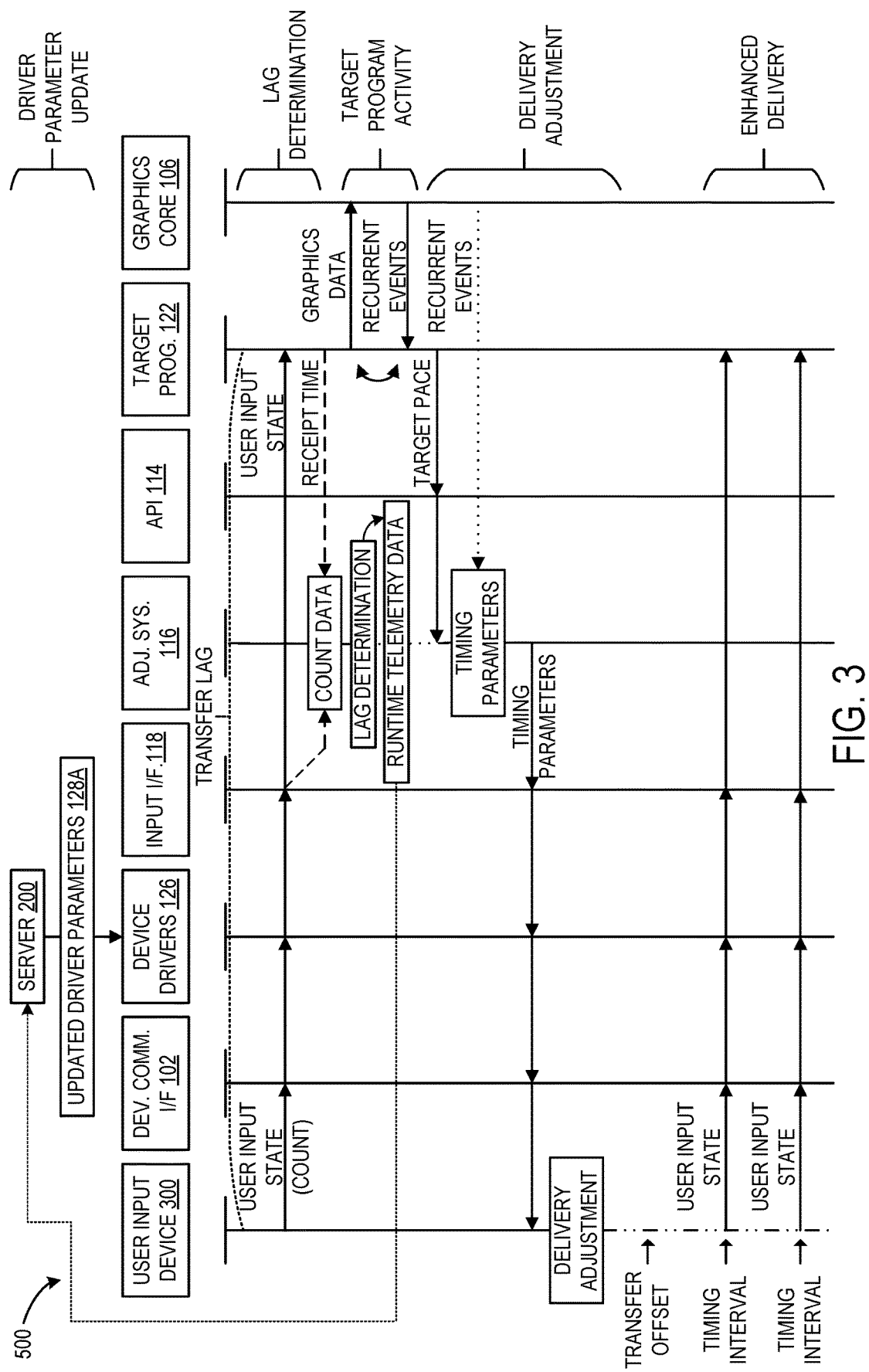
FIG. 3 is a timing diagram showing operation of the computing system of FIG. 1.

Turning now to FIG. 3, a timing diagram 500 is provided that shows operation of the computing system 10 during which run-time telemetry data 130 is generated. FIG. 3 has several phases of activity indicated on the right-hand side of the Figure. These phases of activity can occur in a different order than that indicated in FIG. 3. A first phase of activity includes a driver parameter update phase in which the server 200 sends updated driver parameters 128A to update the device drivers 126 of the user computing device 100. A second phase of activity includes a lag determination phase in which user interface system 112 determines a lag or input latency between the user input device and user computing device 100. A third phase of activity includes a game activity phase in which target program 122 and graphics cores 106 interact to process user input and render graphics for delivery to display 400. This third phase typically occurs throughout many of the other phases disused in FIG. 3, and would comprise normal activity of the target program 122. A fourth phase of activity includes a delivery adjustment phase in which user interface system 112 can adjust transfer/delivery of user input state from user input device 300 to user computing device 100. A fifth phase of activity includes an enhanced delivery phase in which adjustments to the transfer/delivery of user input state are enacted by the user input device 300. The fifth phase of activity will typically be coincident with in-game activity indicated by the third phase of activity. While FIG. 3 shows an example in which the target program is a game, it will be appreciated that it is broadly applicable to other types of target program.

In FIG. 3, an application such as the target program 122, determines when it would like to receive user input from the user input device 300, which can vary from application to application. For example, target program 122 might want to read a state of user input device 300 two milliseconds after the start of each new graphics frame that is being rendered by graphics cores 106, so target program 122 can run associated simulations and prepare a next graphics frame for rendering.

During execution of target program 122 in the third phase of activity, graphics data or render instructions are provided to graphics cores 106 by target program 122 for rendering into graphics frames displayable on display 400. Graphics cores 106 or other elements of user computing device 100 will typically have one or more recurrent system events which can correspond to the activities of graphics data rendering or display. These can include cyclic frame rendering indicators, vertical sync (VSYNC) indicators, or other similar indicators. Typically, target program 122 will have visibility to these various indicators, and can trigger various events or graphics rendering activities based on occurrence of these indicators for the recurrent system events. Target program 122 is thus aware of rendering epochs and associated scheduling of game events and graphics events. Target program 122 can pre-render frames or buffer frames in anticipation of game events that occur responsive to user control. These pre-rendered or buffered frames may or may not be displayed depending on what action the user takes with regard to user input.

However, target program 122 and other similar applications typically desire to associate changes in user input state with particular frames on which user-initiated actions occur. For example, a user pushing a button or selecting a particular direction on a control stick might affect on-screen elements rendered for the user. The delay from when the user actuates the particular user control, such as a button, and when the on-screen elements are displayed to a user can create a perceptible lag. This can reduce the usability of the game and enjoyment for the user, among other disadvantages. Thus, target program 122 would like to at least partially synchronize user input to the graphics frames on which the user input is reflected on-screen, reducing a perception of input lag or latency to users. Rendering or pre-rendering of graphics frames is typically correlated in time to one or more recurrent system events, and target program 122 can use these one or more recurrent system events as a baseline or trigger from which user input state can be delivered to target program 122. Target program 122 can determine a delta or offset from the one or more recurrent system events, and indicate that user input state should be delivered according to that offset from the recurrent system event. This delta or offset can advantageously provide for consistent application of user input state to rendered frames by allowing target program 122 to at least synchronize user input state to particular game activity, such as elements in rendered frames. Target program 122 can thus be provided with the freshest user input state available by triggering not only delivery of user input state to target program 122 based on recurrent system events, but also by triggering sampling and transfer of user input state at the input device level. Upstream handling of this triggering by user input devices is coordinated by user interface system 112.

To indicate such timing, a delivery adjustment phase can occur where target program 122 can indicate a recurrent system event via API 114. This recurrent system event can be used to trigger delivery of user input state to target program 122. User interface system 112 also can have visibility in user computing device 100 to these recurrent system events and can determine timing adjustments relative to the same events. In addition to an indication of the recurrent system event, an offset from this recurrent system event can be indicated by target program 122 which can allow target program 122 time to process user input state and apply that user input state to particular rendered frames or to initiate game-related activity. Thus, target program 122 indicates a target pace or target cadence at which target program 122 wants to receive user input state to better synchronize that user input state with on-screen elements. Target program 122 can advantageously optimize latency of user input state to coincide with rendering events, display screen electrical timing, or other recurrent system events. Once API 114 receives, from target program 122, the one or more indications of recurrent system events and offsets, then user interface system 112 can responsively initiate a timing adjustment phase. The one or more indications of recurrent system events and offsets comprise a target pace or target cadence that also indicates the offset from the recurrent system event.

In an alternative to receiving one or more indications of a recurrent system event or offset from a recurrent system event, adjustment system 116 might perform a predictive or adaptive adjustment process. In this adaptive adjustment process, adjustment system 116 examines calling patterns of target program 122, and determines whether target program 122 is requesting user input state in a predictable pattern. If such a pattern can be found, adjustment system 116 requests input synchronization on behalf of target program 122 without target program 122 having to request such input synchronization. This pattern can be used to determine a relevant recurrent system event from which to baseline delivery of user input state to target program 122, as well as any offset from that recurrent system event.

User interface system 112 determines timing and scheduling for user input transfer/delivery based on the indications received from target program 122 or based on adaptive or predictive determinations. However, part of this timing and scheduling for user input transfer/delivery can depend upon a transfer lag or transfer latency experienced between transfer of user input state from game controller 301 and receipt by target program 122. A lag determination phase can thus be initiated to determine this transfer lag or transfer latency. Moreover, the lag determination phase can periodically be initiated to account for drift and link changes over time. This periodic drift adjustment can be especially helpful when wireless links are employed.

In the lag determination phase, different lag determination processes might occur. In a first example lag determination process, target program 122 receives a timing indicator transferred by user input device 300 that corresponds to a time when user input device 300 transmits user input state. This timing indicator can comprise a monotonically changing count generated by user input device 300 and accompanying or included in communications comprising the user input state transferred by the user input device. Once target program 122 receives this user input state with an accompanying count, target program 122 can indicate the count and a time of receipt of the user input state to user interface system 112. In one instance, target program 122 tags or updates a data structure or data cookie that is visible to user interface system 122. User interface system 122 can read this data structure to determine the count or timestamp associated with when game controller 301 initially transmitted the user input state and when target program 122 receives the user input state. Adjustment system 116 determines a difference in time indicated by the count and timestamp to determine a transfer lag or latency between transmission of the user input state by user input device 300 and receipt by target program 122.

In a second example lag determination process, a timing indicator, such as a count referred to above, is transferred by user input device 300 for delivery to user interface system 112 or adjustment system 116. Adjustment system 116 determines a time or timestamp associated with receipt of the timing indicator transferred by user input device 300. From this time or timestamp, adjustment system 116 can derive the transfer lag or latency. In this second example process, adjustment system 116 might also determine a further latency between receipt of the timing indicator by user interface system 112 and target program 122 to determine a total transfer lag between user input device 300 and target program 122. When the count discussed above is employed, adjustment system 116 can be configured to deal with rollover that occurs in the counter received from game controller 432. Additionally, adjustment system 116 collects run-time telemetry data 130 including an input request timestamp indicating a time at which an input request is initiated by the user computing device 100 to the user input device 300 and an input received timestamp indicating a time at which an input is received by the user computing device 100 from the user input device 300.

Once a transfer lag is determined, then adjustment system 116 can conduct a delivery adjustment phase. In the delivery adjustment phase, adjustment system 116 processes the one or more indications of recurrent system events and offsets received over API 114 as well as the transfer lag to determine one or more timing parameters used for transfer of user input state. The one or more timing parameters comprise a transfer offset and a transfer interval for adjustment of transfer of successive user input state from target program 122. The transfer offset is determined based at least in part on the offset from the recurrent system event received over API 114 and the transfer lag determined in the lag determination process.

In one example, the transfer offset comprises the offset from the recurrent system event indicated by target program 122 and the transfer lag for user input device 300. The transfer offset comprises an indication in +/− microseconds (or other suitable time duration units) informing user input device 300 to speed up or delay its next input state delivery. This allows for real-time correction of clock drift on user input device 300, as well as for reducing the effect of transfer lag to ensure proper timing of receipt of user input state by target program 122 with regard to the recurrent system event. Adjustment system 116 can compute two values, a number of microseconds until a next input state should be sent from an input device, and an interval in microseconds at which subsequent user input state traffic should be sent from the device. These values are then sent to user input device 300 over input device link 350.

Timing adjustment system 314 of user input device 300 then responsively alters delivery pace/cadence and timing for user input state. The enhanced delivery phase comprises delivery of user input state from user input device 300 to user computing device 100 once user input device 300 adjusts user input state traffic as described above. As can be seen in FIG. 3, a transfer offset is used by user input device 300 to adjust a transfer time of a first user input state, and a transfer interval is used to cyclically time transfer of subsequent user input state. Although three such cycles are shown in FIG. 3, it should be understood that this cycle of user input state transfer can continue during operation of user computing device 100 and target program 122. Periodic recurrences of the lag determination phase and the delivery adjustment phase can be performed to correct for drift of clocks and link timing among user input device 300 and target program 122.

As described above, the user computing device 100 is configured to reduce lag or input latency during execution of the target program 122. Additionally, the server 200 is configured to apply updated driver parameters 128A to the user computing device for use during a subsequent execution of the target program 122. This is performed by the driver updater program 210 which uses as input the run-time telemetry data 130 collected by adjustment system 116. The driver updater program 210 is configured to calculate the performance metric 213 using the performance metric module 212, the performance metric 213 being, in one implementation, an input latency determined by a duration of time between the input request timestamp and the input received timestamp. It will be appreciated that in other implementations, this performance metric 213 may be one of a plurality of performance metrics, and the plurality of performance metrics may additionally include a cadence determined by an average interval of time between input requests. Further, in other implementations, the plurality of performance metrics may additionally include a confidence determined by a deviation from the cadence over a first predetermined time duration and/or a trust determined by a deviation from the cadence over a second predetermined time duration, the second predetermined time duration being greater than the first predetermined time duration. This list of possible performance metrics is intended to be illustrative but not exhaustive and the use of other performance metrics in addition or alternatively to those discussed above is also contemplated. It will be appreciated that the performance metrics are determined from run-time telemetry data from multiple user computing devices 200 executing the target program 122.

Based upon the plurality of performance metrics determined by the performance metric module 212, the driver updater program 210 determines the updated driver parameter 128A using the driver determination module 214. In a first example, the updated driver parameter 128A is a transfer duration of an analysis window and/or a transfer offset of an analysis window. The analysis window is a period during which target program 122 requests input such the user input state.

In a second example, the updated driver parameter is a filtering parameter whereby input that falls outside a predetermined range is determined to be invalid. This may be useful, for example, to filter out noise in the input signal such as latency measurements that are obvious errors due to their extreme length.

In a third example, the updated driver parameter is a scaling window parameter wherein an input age is determined to be valid. In this example, input that falls within an age range (input within a certain input latency range) is used by the target program 122, whereas input outside the age range is not used by the target program 122. In this manner, only relative fresh latency information may be considered by the computing system to adjust the driver parameters, while outdated information may be ignored, thereby increasing the accuracy of the system.

Figure 4:
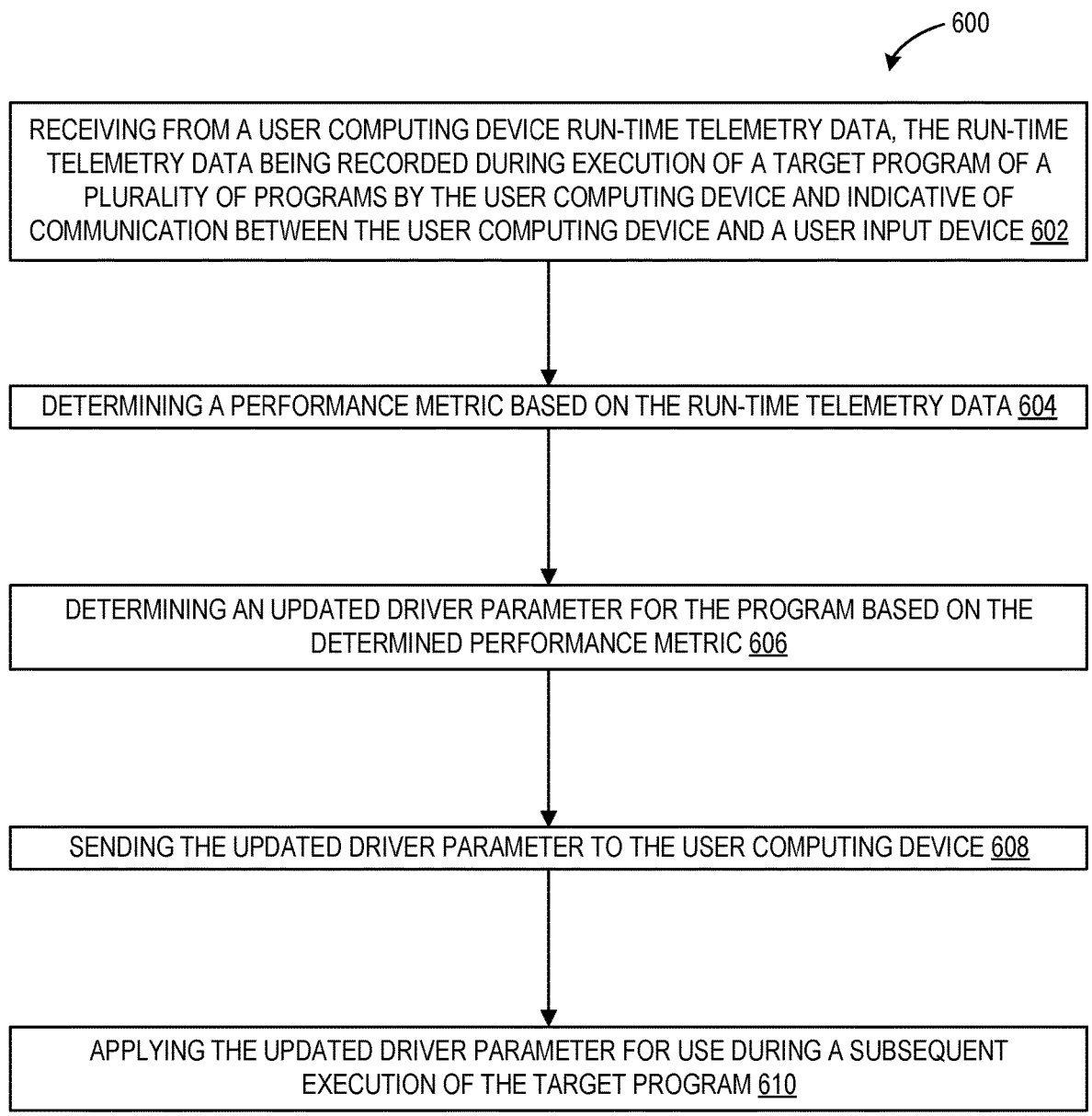
FIG. 4 shows a flowchart for a method according to one embodiment of the present disclosure.

With reference now to FIG. 4, a flow diagram is illustrated depicting an example method 600 for updating a driver parameter for a user computing device, for each of a plurality of programs executable by the user computing device. The following description of method 600 is provided with reference to the software and hardware components described herein and shown in FIGS. 1-3. For example, the method 600 may be performed by the computing system 10, hardware, software, and/or firmware of the computing system 10, or a suitable combination of components described herein.

It will be appreciated that following description of method 600 is provided by way of example and is not meant to be limiting. Therefore, it is to be understood that method 600 may include additional and/or alternative steps relative to those illustrated in FIG. 4. Further, it is to be understood that the steps of method 600 may be performed in any suitable order. Further still, it is to be understood that one or more steps may be omitted from method 600 without departing from the scope of this disclosure. It will also be appreciated that method 600 also may be performed in other contexts using other suitable components.

As shown in FIG. 4, the method 600 comprises at 602 receiving from the user computing device run-time telemetry data, the run-time telemetry data being recorded during execution of a target program of the plurality of programs by the user computing device. The user computing device is configured to receive input from a user input device; and the run-time telemetry data includes an input request timestamp indicating a time at which an input request is initiated by the user computing device to the user input device, and an input received timestamp indicating a time at which an input is received by the user computing device from the user input device.

At 604, the method 600 further comprises determining a performance metric based on the run-time telemetry data. In one example, the performance metric is an input latency determined by a duration of time between the input request timestamp and the input received timestamp. In another example, the performance metric is one of a plurality of performance metrics, and the plurality of performance metrics additionally includes a cadence determined by an average interval of time between input requests. In another example, the plurality of performance metrics additionally includes a confidence determined by a deviation from the cadence over a first predetermined time duration. In another example, the plurality of performance metrics additionally includes a trust determined by a deviation from the cadence over a second predetermined time duration, the second predetermined time duration being greater than the first predetermined time duration.

At 606, the method 600 further comprises determining an updated driver parameter for the target program based on the determined performance metric. In one example, the updated driver parameter is a transfer duration of an analysis window, and/or a transfer offset of an analysis window. In another example, the updated driver parameter is a filtering parameter whereby input that falls outside a predetermined range is determined to be invalid. In another example, the updated driver parameter is a scaling window parameter wherein an input age is determined to be valid, as discussed above.

At 608, the method 600 further comprises sending the updated driver parameter to the user computing device. At 610, the method 600 further comprises applying the updated driver parameter for use during a subsequent execution of the target program.

It will be appreciated that the steps 602-610 are performed on a program-by-program basis across a broad installation base of a target program on multiple (e.g., thousands or millions) of user computing devices, such that program specific run-time telemetry data can be gathered from a broad spectrum of users. Typically, the user computer devices are of a common device type, or of one of a select subset of device types, and the run-time telemetry data is also organized by device type of the user computer devices. By analyzing the run-time telemetry data in actual use by multiple users on multiple computing devices of a common device type in this manner, the server may determine optimized driver parameters for the target program running on a target hardware or device type, and send the optimized driver parameters to each user computing device of the same type running the target program. Further, on each user computing device, a program-specific driver parameter library may be maintained, and when each program is executed the appropriate updated driver parameters received from the server can be selected for use with the executed program. In this manner, the user computing device can optimize latency for multiple different programs, using different optimization techniques for each as implemented through the adoption of the program-specific driver parameters, thereby avoiding the drawbacks of the one-size-fits-all approach to optimization that was heretofore conventional, discussed above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
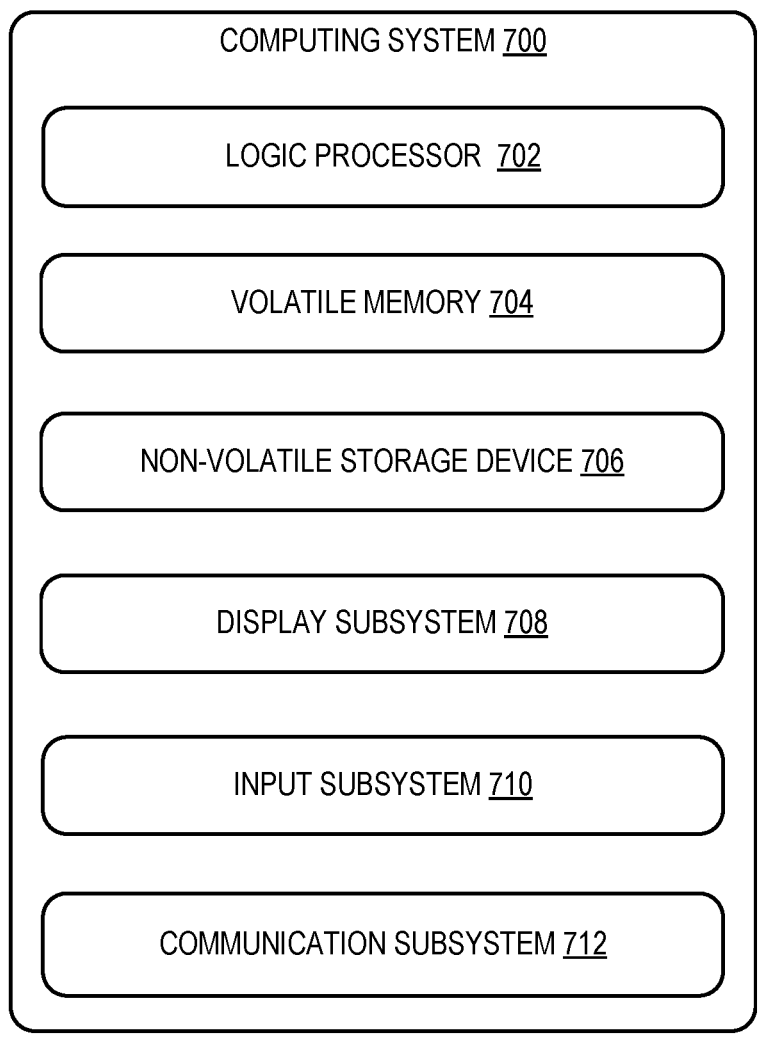
FIG. 5 shows an example computing system according to an embodiment of the present disclosure.

FIG. 5 schematically shows a non-limiting embodiment of a computing system 700 that can enact one or more of the methods and processes described above. Computing system 700 is shown in simplified form. Computing system 700 may embody the computer device 10 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706.

Computing system 700 may optionally include a display subsystem 708, input subsystem 710, communication subsystem 712, and/or other components not shown in FIG. 5.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional description of aspects of the present disclosure. One aspect provides a computing system comprising a server that includes one or more processors. For each of a plurality of programs executable by a user computing device that is configured to receive input from a user input device, the one or more processors may be configured to receive from the user computing device run-time telemetry data. The run-time telemetry data may be recorded during execution of a target program of the plurality of programs by the user computing device and may be indicative of communication between the user input device and the user computing device. The one or more processors may be further configured to determine a performance metric based on the run-time telemetry data, determine an updated driver parameter for the target program based on the determined performance metric, send the updated driver parameter to the user computing device, and apply the updated driver parameter for use during a subsequent execution of the target program.

In this aspect, additionally or alternatively, the run-time telemetry data may include an input request timestamp and an input received timestamp. The input request timestamp may indicate a time at which an input request is initiated by the user computing device to the user input device. The input received timestamp may indicate a time at which an input is received by the user computing device from the user input device.

In this aspect, additionally or alternatively, the performance metric may be an input latency determined by a duration of time between the input request timestamp and the input received timestamp. In this aspect, additionally or alternatively, the performance metric may be one of a plurality of performance metrics. The plurality of performance metrics may additionally include a cadence determined by an average interval of time between input requests. In this aspect, additionally or alternatively, the plurality of performance metrics may additionally include a confidence determined by a deviation from the cadence over a first predetermined time duration. In this aspect, additionally or alternatively, the plurality of performance metrics may additionally include a trust determined by a deviation from the cadence over a second predetermined time duration, and the second predetermined time duration may be greater than the first predetermined time duration.

In this aspect, additionally or alternatively, the updated driver parameter may be a transfer duration of an analysis window and/or a transfer offset of an analysis window. In this aspect, additionally or alternatively, the updated driver parameter may be a filtering parameter whereby input that falls outside a predetermined range is determined to be invalid. In this aspect, additionally or alternatively, the updated driver parameter may be a scaling window parameter wherein an input age is determined to be valid.

Another aspect provides a method for updating a driver parameter for a user computing device. For each of a plurality of programs executable by a user computing device that is configured to receive input from a user input device, the method may comprise receiving from the user computing device run-time telemetry data. The run-time telemetry data may be recorded during execution of a target program of the plurality of programs by the user computing device and may be indicative of communication between the user input device and the user computing device. The method may further include determining a performance metric based on the run-time telemetry data, determining an updated driver parameter for the target program based on the determined performance metric, sending the updated driver parameter to the user computing device, and applying the updated driver parameter for use during a subsequent execution of the target program.

In this aspect, additionally or alternatively, the run-time telemetry data may include an input request timestamp and an input received timestamp. The input request timestamp may indicate a time at which an input request is initiated by the user computing device to the user input device. The input received timestamp may indicate a time at which an input is received by the user computing device from the user input device.

In this aspect, additionally or alternatively, the performance metric may be an input latency determined by a duration of time between the input request timestamp and the input received timestamp. In this aspect, additionally or alternatively, the performance metric may be one of a plurality of performance metrics. The plurality of performance metrics may additionally include a cadence determined by an average interval of time between input requests. In this aspect, additionally or alternatively, the plurality of performance metrics may additionally include a confidence determined by a deviation from the cadence over a first predetermined time duration. In this aspect, additionally or alternatively, the plurality of performance metrics may additionally include a trust determined by a deviation from the cadence over a second predetermined time duration, and the second predetermined time duration may be greater than the first predetermined time duration.

In this aspect, additionally or alternatively, the updated driver parameter may be a transfer duration of an analysis window and/or a transfer offset of an analysis window. In this aspect, additionally or alternatively, the updated driver parameter may be a filtering parameter whereby input that falls outside a predetermined range is determined to be invalid. In this aspect, additionally or alternatively, the updated driver parameter may be a scaling window parameter wherein an input age is determined to be valid.

Another aspect provides a user computing device including a device processor and configured to receive user input from a user input device. For each of a plurality of programs executable by the user computing device, the device processor may be configured to collect run-time telemetry data. The run-time telemetry data may be recorded during execution of a target program of the plurality of programs by the user computing device and may be indicative of communication between the user input device and the user computing device. The device processor may be further configured to send the run-time telemetry data to a server, receive from the server an updated driver parameter for the target program based upon a performance metric, install the updated driver parameter, and perform a subsequent execution of the target program using the updated driver parameter.

In this aspect, additionally or alternatively, for each of the plurality of programs executable by the user computing device, the device processor may be further configured to collect run-time telemetry data. The run-time telemetry data may be recorded during execution each of the plurality of programs by the user computing device. The device processor may be further configured to send the run-time telemetry data to a server, receive from the server an updated driver parameter for each of the plurality of programs based upon the performance metric, install the updated driver parameter, and perform a subsequent execution of each of the plurality of programs using the updated driver parameter.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a server including one or more processors, the one or more processors configured to:
for each of a plurality of programs executable by a user computing device, the user computing device being configured to receive input from a user input device:
receive from the user computing device run-time telemetry data, the run-time telemetry data being recorded during execution of a target program of the plurality of programs by the user computing device and being indicative of communication between the user input device and the user computing device;
determine a performance metric based on the run-time telemetry data;
determine an updated driver parameter for the target program based on the determined performance metric;
send the updated driver parameter to the user computing device; and
apply the updated driver parameter for use during a subsequent execution of the target program.

2. The computing system of claim 1, wherein the run-time telemetry data includes:
an input request timestamp indicating a time at which an input request is initiated by the user computing device to the user input device; and
an input received timestamp indicating a time at which an input is received by the user computing device from the user input device.

3. The computing system of claim 2, wherein the performance metric is:
an input latency determined by a duration of time between the input request timestamp and the input received timestamp.

4. The computing system of claim 3, wherein the performance metric is one of a plurality of performance metrics, the plurality of performance metrics additionally including:
a cadence determined by an average interval of time between input requests.

5. The computing system of claim 4, wherein the plurality of performance metrics additionally includes:
a confidence determined by a deviation from the cadence over a first predetermined time duration.

6. The computing system of claim 5, wherein the plurality of performance metrics additionally includes:
a trust determined by a deviation from the cadence over a second predetermined time duration, the second predetermined time duration being greater than the first predetermined time duration.

7. The computing system of claim 2, wherein the updated driver parameter is:
a transfer duration of an analysis window; and/or
a transfer offset of an analysis window.

8. The computing system of claim 2, wherein the updated driver parameter is:
a filtering parameter whereby input that falls outside a predetermined range is determined to be invalid.

9. The computing system of claim 2, wherein the updated driver parameter is:
a scaling window parameter wherein an input age is determined to be valid.

10. A method for updating a driver parameter for a user computing device, the method comprising:
for each of a plurality of programs executable by the user computing device, the user computing device being configured to receive input from a user input device:
receiving from the user computing device run-time telemetry data, the run-time telemetry data being recorded during execution of a target program of the plurality of programs by the user computing device and being indicative of communication between the user input device and the user computing device;
determining a performance metric based on the run-time telemetry data;
determining an updated driver parameter for the target program based on the determined performance metric;
sending the updated driver parameter to the user computing device; and
applying the updated driver parameter for use during a subsequent execution of the target program.

11. The method of claim 10, wherein
the run-time telemetry data includes:
an input request timestamp indicating a time at which an input request is initiated by the user computing device to the user input device; and
an input received timestamp indicating a time at which an input is received by the user computing device from the user input device.

12. The method of claim 11, wherein the performance metric is:
an input latency determined by a duration of time between the input request timestamp and the input received timestamp.

13. The method of claim 12, wherein the performance metric is one of a plurality of performance metrics, the plurality of performance metrics additionally including:
a cadence determined by an average interval of time between input requests.

14. The method of claim 13, wherein the plurality of performance metrics additionally includes:
a confidence determined by a deviation from the cadence over a first predetermined time duration.

15. The method of claim 14, wherein the plurality of performance metrics additionally includes:
a trust determined by a deviation from the cadence over a second predetermined time duration, the second predetermined time duration being greater than the first predetermined time duration.

16. The method of claim 11, wherein the updated driver parameter is:
a transfer duration of an analysis window; and/or
a transfer offset of an analysis window.

17. The method of claim 11, wherein the updated driver parameter is:
a filtering parameter whereby input that falls outside a predetermined range is determined to be invalid.

18. The method of claim 11, wherein the updated driver parameter is:
a scaling window parameter wherein an input age is determined to be valid.

19. A computing system comprising:
a user computing device including a device processor and configured to receive user input from a user input device, the device processor being configured to:

for each of a plurality of programs executable by the user computing device:
  collect run-time telemetry data, the run-time telemetry data being recorded during execution of a target program of the plurality of programs by the user computing device and being indicative of communication between the user computing device and the user input device;
  send the run-time telemetry data to a server;
  receive from the server an updated driver parameter for the target program based upon a performance metric;
  install the updated driver parameter; and
  perform a subsequent execution of the target program using the updated driver parameter.

20. The computing system of claim 19, wherein the device processor is further configured to:
for each of the plurality of programs executable by the user computing device:
  collect run-time telemetry data, the run-time telemetry data being recorded during execution each of the plurality of programs by the user computing device;
  send the run-time telemetry data to the server;
  receive from the server an updated driver parameter for each of the plurality of programs based upon the performance metric;
  install the updated driver parameter; and
  perform a subsequent execution of each of the plurality of programs using the updated driver parameter.

* * * * *